United States Patent [19]
Toth

[11] 3,781,620

[45] Dec. 25, 1973

[54] FULL WAVE GOVERNOR CONTROL SYSTEM

[75] Inventor: Tibor E. Toth, Congers, N.Y.

[73] Assignee: Union Carbide Corporation, New York, N.Y.

[22] Filed: Feb. 1, 1971

[21] Appl. No.: 111,202

[52] U.S. Cl. .............................. 318/331, 318/345
[51] Int. Cl. ........................................... H02p 5/16
[58] Field of Search ................... 318/331, 345, 332

[56] References Cited
UNITED STATES PATENTS

| | | | |
|---|---|---|---|
| 3,604,996 | 9/1971 | Lutz | 318/331 |
| 3,504,260 | 3/1970 | Staples | 318/331 |
| 3,604,996 | 9/1971 | Lutz | 318/345 |
| 3,497,786 | 2/1970 | Lombardo | 318/331 |
| 3,275,926 | 9/1966 | Sheheen | 318/345 |
| 3,465,227 | 9/1969 | Ivie | 318/345 |
| 3,519,913 | 7/1970 | Janecek | 318/331 |

Primary Examiner—Bernard A. Gilheany
Assistant Examiner—Thomas Langer
Attorney—Paul A. Rose, Harrie M. Humphreys, Dominic J. Terminello and E. Lieberstein

[57] ABSTRACT

A full wave governor control system for a DC motor which regulates the motor speed in response to an error control signal derived by sensing the emf of the motor and comparing it to a reference signal which varies periodically from a first DC potential to a second and higher DC potential at a rate in synchronism with each half-cycle of applied alternating line voltage.

8 Claims, 3 Drawing Figures

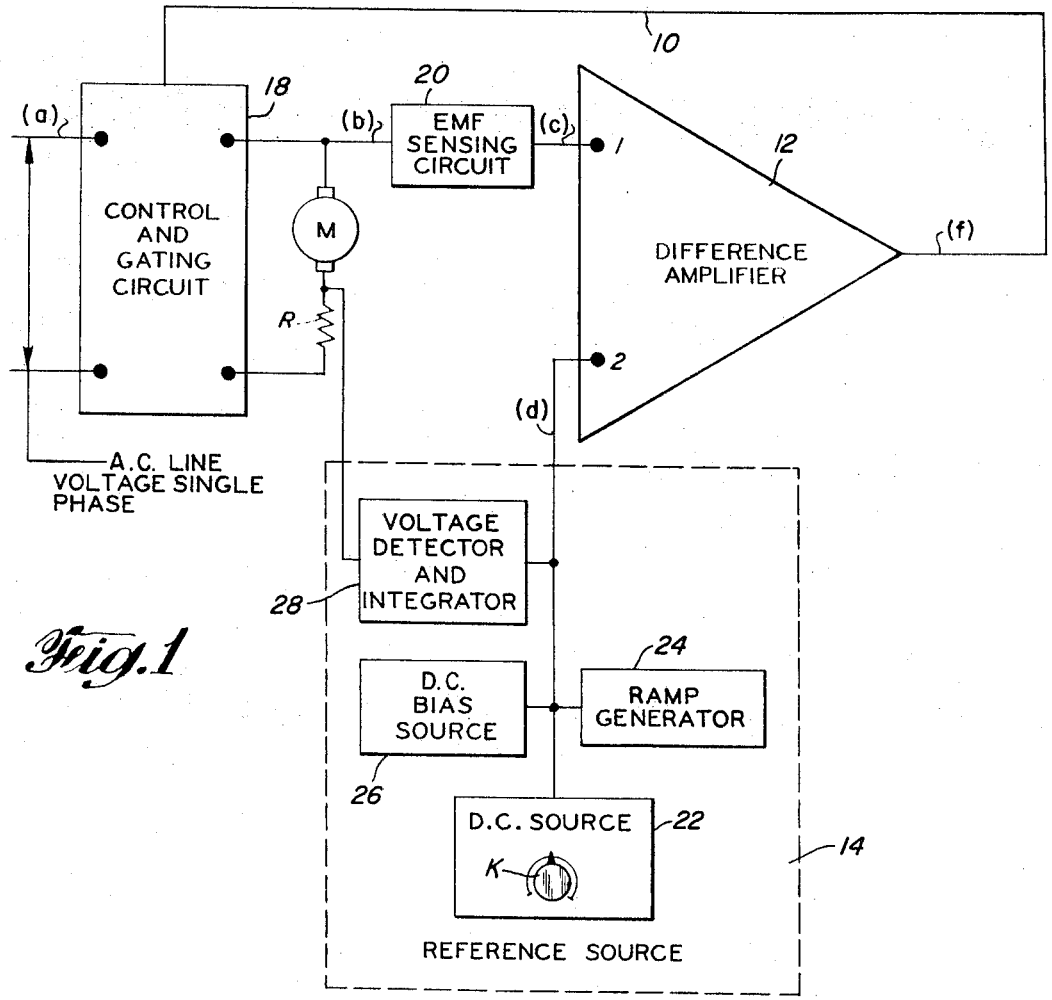
Fig. 1
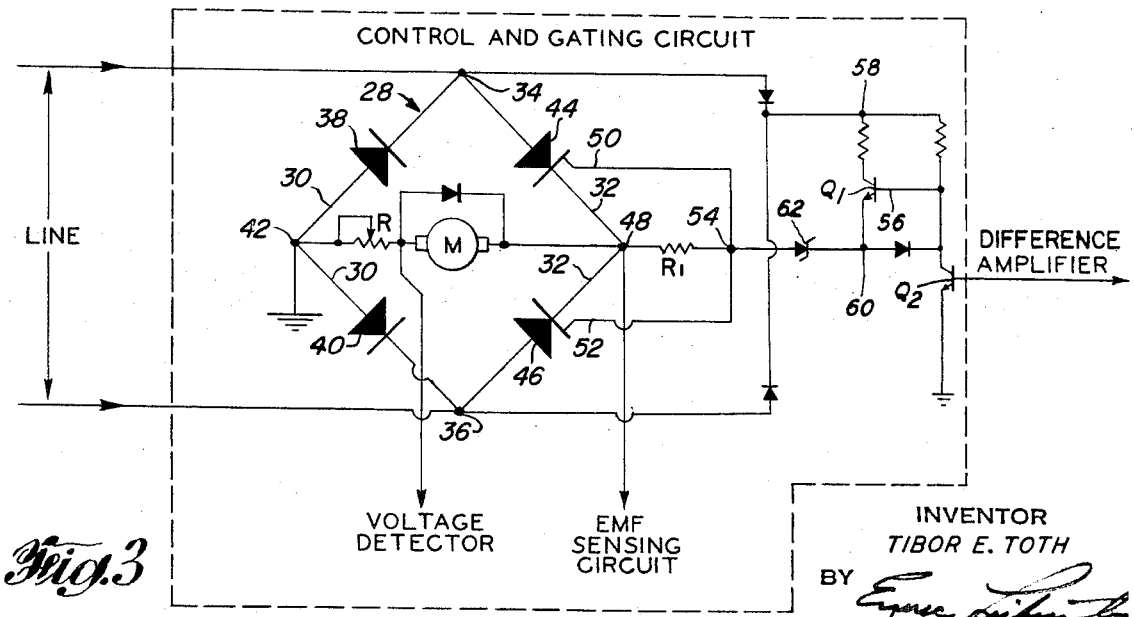
Fig. 3
INVENTOR
TIBOR E. TOTH
BY
ATTORNEY

FULL WAVE GOVERNOR CONTROL SYSTEM

This invention relates to a full wave governor control system for presetting and regulating the output speed of a DC driving motor.

In MIG welding as well as other forms of welding, such as in submerged arc welding, a consumable electrode is driven toward a workpiece by a DC motor at a controlled speed. The output speed of the motor is determined and maintained by a governor control which modulates the power to the motor armature in response to an error signal which is proportional to the difference between the actual motor speed and the desired motor operating speed. Present day governor controls using unfiltered rectified line voltage as the input source are defined as either of half-wave or full-wave design. Half-wave governor control systems operate by switching power to the motor for a greater or smaller part of one-half of the input AC cycle and allowing the motor to coast for the remainder of the full cycle. The amount of power applied to the motor in the energizing interval is a limiting factor in the selection of the size of the motor. To avoid overheating with a half-wave governor control the motor must necessarily be of a size greater than would otherwise be necessary if power switching occurred during each AC half-cycle. In prior art full-wave governors motor overheating is caused by variations in the conduction angle between successive half-cycles. Portable welding units necessitate light weight motors which are compact and as small in size as is possible.

It is therefore the principal object of the present invention to provide a full-wave governor control system for a DC motor which will deliver sufficient power to the motor during each half-cycle of the applied AC input to maintain a predetermined motor output speed irrespective of load variations over a wide motor speed range and with a minimum of unbalance between successive half-cycles.

It is further object of the present invention to provide a governor control system for a DC motor which is sensitive to correct for motor load variations at relatively low motor operating speeds as well as for high motor operating speeds.

Further objects and advantages of the invention will become apparent upon reading the following description and claims taken in connection with the accompanying drawings in which:

FIG. 1 is a block diagram of the governor control system illustrating the invention;

FIG. 3 is a schematic circuit diagram of the control and gating circuit illustrated in block form in FIG. 1.

Figure 2:
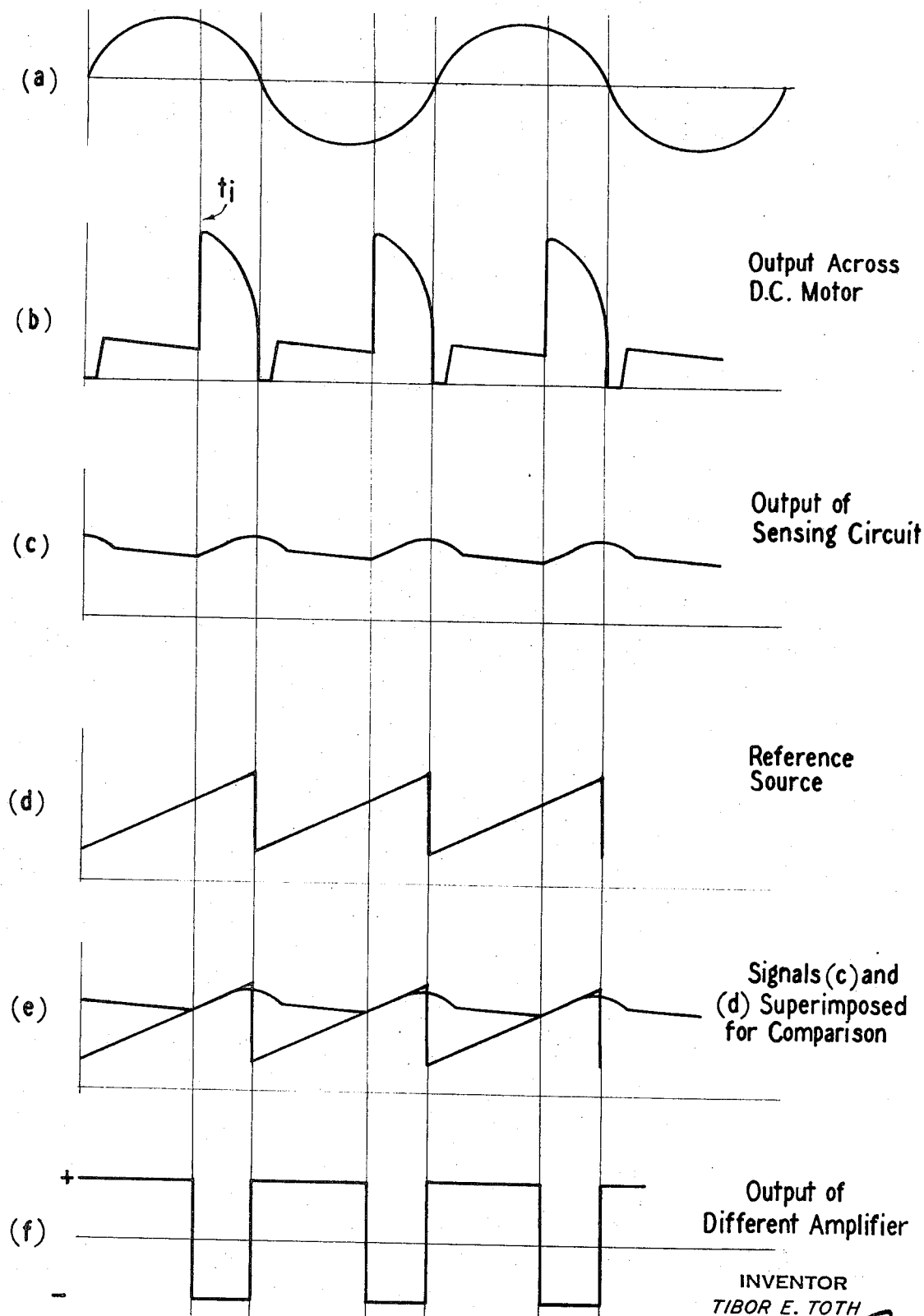
FIG. 2 (a–f) is a series of electrical wave forms indicating the signal wave shapes that occur at various indicated key points in the block diagram of FIG. 1 with the applied AC input signal shown for reference purposes.

The governor control system 10 of the present invention is shown in block diagram form in FIG. 1 and includes a differential amplifier 12 which receives an error voltage signal across its input terminals 1 and 2 proportional to the difference between a voltage signal representing the actual speed of the DC motor M and a reference potential provided by the reference source 14. The differential amplifier 12 is preferably a conventional operational amplifier which provides an output DC signal of either positive or negative polarity and of fixed amplitude. The output signal is introduced into the control and gating circuit 18 which controls in response to such signal the delivery of power to the motor M in a manner to be explained in greater detail hereinafter.

Motor M is of the constant field DC type and for purposes of the present disclosure is intended to include shunt wound motors, and motors excited by permanent magnets. Such motors exhibit a common voltage speed characteristic wherein the back emf of the motor, during its deenergization or coasting period, is substantially linearly proportional to the speed of the motor.

Coupled across motor M is an emf sensing circuit 20 which provides an output signal proportional to the generated back emf developed across the motor M. Included in emf sensing circuit 20 is a conventional circuit for attenuating the sharp potential rise applied across the motor M during the energization period and a conventional capacitive circuit which charges to a voltage level proportional to the back emf generated across the motor M during its deenergization or coasting period. Thus, the output of emf sensing circuit 20 is substantially a DC voltage having an amplitude which varies with the speed of motor M. The output of circuit 20 is connected directly to input terminal 1 of differential amplifier 12.

Reference source 14 is a composite of a plurality of superimposed sources for providing a combined output which is connected to input terminal 2 of differential amplifier 12. The combined output of reference source 14 is a voltage signal having a magnitude which varies periodically from a first DC potential to a second and higher DC potential at a rate in synchronism with each half-cycle of applied alternating line voltage. Although such a signal may be developed by a number of alternate techniques, it is preferred that it be generated by superimposing a DC signal with that of a varying signal which may for example be provided by a ramp generator.

The DC signal is provided by DC source 22 is combination with a DC bias source 26 and a voltage detector and integrator 28. DC source 22 includes a manually adjustable output level control identified as knob K. The position of knob K represents the output speed of motor M.

Any number of conventional electronic circuits may be used as the ramp generator 24 to generate a ramp signal and preferably one having a linear but adjustable slope. One example would be a simple R-C timing circuit where only a minor portion of the timing cycle is used as the generated linear ramp. The slope of the ramp may be varied by varying the magnitude of the resistor. A linear ramp signal is preferred over other wave shapes for reasons which will become obvious in the explanation of the operation of the system in connection with FIG. 2. Synchronism with twice the applied AC input line voltage may be achieved by using the rectified line voltage to trigger the ramp generator 24.

The output potential of DC bias source 26 is of a polarity opposite to the output polarity of DC source 22 and of a magnitude at least equal to the maximum amplitude of the ramp signal to prevent the occurrence of a false error signal when knob K is turned down to zero representing a motor speed of zero.

Signal source 28 increases the sensitivity of the control system 10 at low operating motor speeds. Signal source 28 detects the voltage across a small ohmic resistor R connected in series with motor M. The detected voltage is integrated to provide a substantially flat DC signal having an amplitude which is proportional to the voltage across resistor R. At relatively high motor operating speeds the voltage across resistor R is small relative to the emf developed across the motor; hence a voltage change across R will have an insignificant effect on the error signal between terminals 1 and 2 of differential amplifier 12. However, at relatively low motor operating speeds, the voltage across R is relatively large in comparison to the emf across the motor and as such an equivalent voltage change thereacross will have a significant effect on the error signal at terminals 1 and 2 of differential amplifier 12. As will become apparent from the following discussion of the operation of the system when the reference level output of reference source 14 exceeds the output of emf sensing circuit 20 the control and gating circuit 18 is fired and the motor M is energized. By raising the output level of reference source 14 the firing time is advanced and the motor M receives more power in a given AC half-cycle.

The operation of the governor control system 10 will be discussed with reference to the signal wave shapes shown in FIG. 2 (*a-f*). FIG. 2 (*a*) represents the applied input signal to the system 10 which is preferably a 60 cycle single phase sinusoidal AC signal taken from any suitable AC line supply. The applied input signal is full wave rectified in the control and gating circuit 18. Power is delivered to the motor M at a predetermined time ($T_i$) during each half-cycle to maintain a constant output speed. The output wave shape across the motor is illustrated in FIG. 2 (*b*). The emf sensing circuit 20 provides an output as shown in FIG. 3 (*c*) which is proportional to the back emf generated by the motor during the motor coasting period. Reference source 14 as stated earlier provides an output wave form as shown in FIG. 2 (*d*) which varies periodically in synchronism with each half-cycle of the input line signal. The background DC level shown in FIG. 2 (*d*) represents the combined DC outputs of DC source 22, DC bias source 26 and the output of voltage detector 28. The differential amplifier 12 compares the output as shown in FIG. 2 (*c*) with the output of the reference source as shown in FIG. 2 (*d*). The wave shapes of FIG. 2 (*c*) and FIG. 2 (*d*) are shown superimposed for comparison in FIG. 2 (*e*). When the output of the reference source 14 FIG. 2 (*d*) exceeds the output of sensing circuit 20 FIG. 2 (*c*) identified as instant $T_i$ the differential amplifier 12 reverses its output polarity as shown in FIG. 2 (*f*). The output polarity of differential amplifier 12 determines the mode of operation for the control and gating circuit 18. A negative output fires gating circuit 18 which in turn switches power to the motor M.

It should be apparent from the signal wave shapes in FIGS. 2 (*a-f*) that the crossover instant $T_i$ may be independently adjusted by varying the height of the DC reference lever or by varying the slope of the generated ramp signal. A linearly rising wave form is preferred to insure uniform and linear speed adjustment. The DC reference level may be manually adjusted simply by turning knob K. Automatic adjustment of the DC level will occur in response to a voltage change across resistor R when the motor operates at relatively low speeds. It should further be apparent that the crossover instant $T_i$ will automatically vary with changes in load. The output level of the emf sensing circuit 20 illustrated in FIG. 2 (*c*) will move up or down in response to a change in motor load which will in turn advance or delay the occurrence of $T_i$.

FIG. 3 is a schematic circuit diagram of the control and gating circuit 18. As shown the circuit consists of a full wave bridge 28 having two parallel arms 30 and 32 connected respectively at points 34 and 36. Points 34 and 36 are connected to the input AC source of line voltage. Arm 30 includes two diodes 38 and 40 respectively with their anodes connected in common at ground point 42. Arms 32 of bridge 28 includes two silicon controlled rectifiers 44 and 46 having their cathodes connected in common at point 48. Motor M is connected between points 42 and 48 of bridge circuit 28 with resistor R connected in series therewith.

During the positive going half-cycle of line voltage point 34 will be positive with respect to point 36 establishing a current path through SCR 44 (once energized) motor M and diode 40. During the opposite half-cycle when point 34 is negative with respect to point 36, a current path is completed through SCR 44 (once energized) motor M and diode 38.

Gate 50 of SCR 44 and gate 52 of SCR 46 is tied in common to point 54. Resistor R1 is a relatively low impedance resistor of about 1,000 ohms which isolates point 48 from point 54 and provides a common discharge path to ground for transients or noise pulses. A triggering signal is simultaneously applied to gates 50 and 52 of SCR's 44 and 46 respectively, from transistor Q1 once transistor Q1 is forward biased. Transistor Q1 is maintained back biased in an off mode by transistor Q2 for as long as the output of differential amplifier 12 is positive. A positive output from differential amplifier 12 forward biases transistor Q2 clamping the base 56 of transistor Q1 to ground. The coupling arrangement between transistors Q1 and Q2 is known in the art as a totem pole arrangement. When the output of differential amplifier 12 goes negative transistor Q2 turns off releasing the clamp on the base 56 of transistor Q1 thereby turning it on. A full-wave rectified signal exists at point 58 with respect to ground providing the power for transistors Q1 and Q2 respectively. As soon as transistor Q1 is forward biased the potential at point 60 rises to a level substantially above the breakdown potential of zener diode 62 and a triggering pulse appears simultaneously at both gates 50 and 52 of SCR's 44 and 46. Although the triggering signal appears simultaneously at both gates only one SCR will fire. The polarity between points 34 and 36 will determine which SCR will fire. If point 34 is positive with respect to point 36 then SCR 44 will fire while SCR 46 will remain back biased and off. When the polarity between points 34 and 36 reverses i.e. when the line voltage goes from positive to negative or vice versa the fired SCR turns off and both SCR's remain off until the output of differential amplifier 12 again goes negative. It is impossible for both SCR's to fire during the same half-cycle of line supply. Moreover, until the output of differential amplifier 12 goes negative neither SCR can be triggered. As explained earlier in connection with the operation of the system the output of differential amplifier 12 reverses whenever the output of reference source 14 exceeds the output of emf sensing circuit 20 and reverts back to its original state at the end of each half-cycle of line signal.

What is claimed is:

1. A governor control system for regulating the output speed of a DC motor comprising:

a. a source of alternating current;

b. a control circuit for coupling said source of alternating current to the DC motor, said control circuit comprising a full wave bridge rectifier network including gating means for controlling the conduction of said network during each half cycle of alternating current;

c. sensing means electrically connected to said DC motor and directly responsive to the back electromotive force (emf) developed across said motor when said motor is coasting;

d. means for generating a reference potential which varies periodically from a first DC potential to a second and higher DC potential at a rate in synchronism with each half-cycle of said source of alternating current with said first DC potential being initiated at the zero point of each half cycle; and e. difference amplifier means being responsive to said sensing means and to said reference potential for energizing said gating means when the instantaneous DC magnitude of said reference potential in each half-cycle of alternating current exceeds the magnitude of the output of said sensing means and for deenergizing said gating means when the instantaneous DC magnitude of said reference source drops below the magnitude of the output of said sensing means.

2. A governor control system as defined in claim 1 wherein said means for generating a reference potential comprises a source of DC potential and a superimposed source of varying potential, the output of which increases linearly in magnitude from zero to a predetermined magnitude during each half-cycle of alternating current.

3. A governor control system as defined in claim 2 wherein the output of said source of DC potential is manually adjustable.

4. A governor control system as defined in claim 3 further comprising means for generating a DC bias of opposite polarity to said source of DC potential and means responsive to the current flowing through said motor for generating a DC current feedback potential.

5. A governor control system as defined in claim 3 wherein said gating means comprises a pair of controlled rectifiers.

6. A governor control system as defined in claim 5 wherein said controlled rectifiers are connected as one arm of the rectifier bridge and further comprising a pair of diodes connected as the other arm of the rectifier bridge.

7. A governor control system as defined in claim 6 wherein each of said controlled rectifiers has a gate terminal and wherein said gate terminals are connected in common to a source of triggering potential.

8. A governor control system as defined in claim 7 wherein said triggering source of potential comprises a first transistor having a base, emitter and collector terminal with said collector terminal being connected to a source of potential; a zener diode coupling said emitter to each of said gate terminals respectively of said controlled rectifiers; a second transistor having a base, emitter and collector terminal with the collector and emitter terminals thereof coupled in series with the base terminal of said first transistor, said base terminal of said second transistor being coupled to the output of said difference amplifier such that when said second transistor is forward biased said first transistor is reversed biased and when said second transistor is reversed biased said first transistor is forward biased thereby supplying a triggering pulse to said gate terminals.

* * * * *